May 5, 1942.
P. B. REEVES
2,281,859
LUBRICATING DEVICE
Filed April 24, 1939
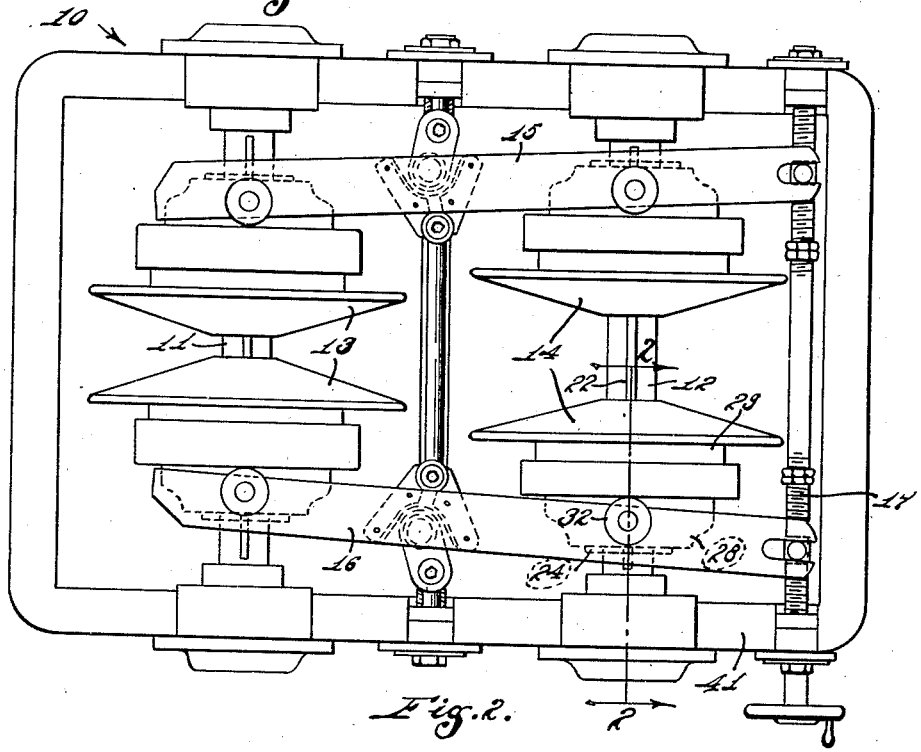
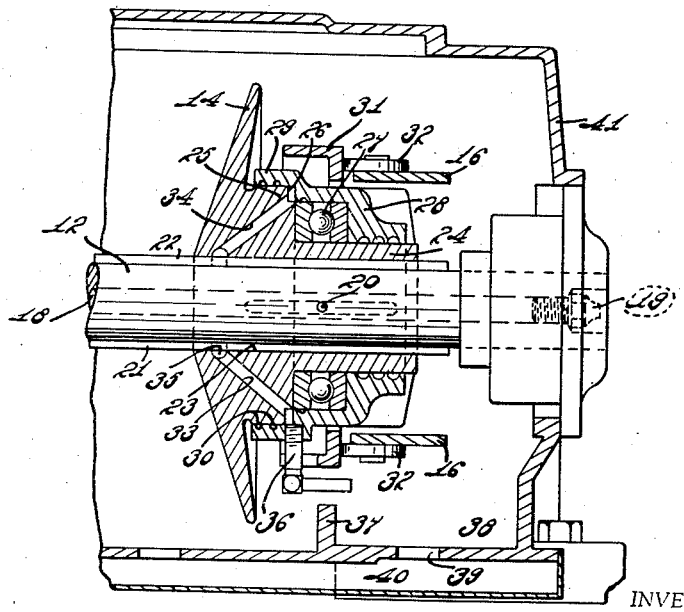
INVENTOR.
Paul B. Reeves,
BY
Hood & Hahn
ATTORNEYS.

Patented May 5, 1942

2,281,859

UNITED STATES PATENT OFFICE 2,281,859

LUBRICATION DEVICE

Paul B. Reeves, Columbus, Ind., assignor to Reeves Pulley Company, Columbus, Ind., a corporation of Indiana Application April 24, 1939, Serial No. 269,607

8 Claims. (Cl. 308—5)

The present invention relates to a lubrication device, and has particular application to means for preventing overflow of lubricant from a point at which it is desired to a point where it would be deleterious to the operation of an organization including a shaft and an element fitted upon said shaft and movable with respect thereto. The primary object of the invention is to provide means of the character above suggested whereby excess lubricant will be conducted, by centrifugal effects, from the region being lubricated to a region remote from a point at which the presence of lubricant would be undesirable, will be collected at the latter region, and will be conducted thence by gravity to a point of discharge.

Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a plan view, more or less diagrammatic, of a Reeves type variable speed transmission; and Fig. 2 is a section taken substantially on the line 2—2 of Fig. 1 and looking in the direction of the arrows, and illustrating in detail the preferred embodiment of my invention.

In the accompanying drawing, the invention of this application is shown embodied in a Reeves type variable speed transmission indicated generally by the reference numeral 10 and comprising two parallel shafts 11 and 12 each of which carries a pair of mating, axially shiftable, coned discs, the discs 13 on the shaft 11 forming one V-pulley and the discs 14 on the shaft 12 forming a cooperating V-pulley. Of course an edge active belt provides a driving connection between the two pulleys, and the relative positions of the four discs are controlled by pairs of shifting levers 15 and 16 which, in turn, are controlled by a screw shaft 17. All of the above is conventional construction.

It is desirable, of course, to lubricate the region between the discs and the shafts upon which said discs are mounted; but it is highly undesirable to permit lubricating material to find its way onto the coned faces of the discs 13 and 14. Obviously, if the interiors of the disc bores are provided with films of lubricant, when the discs are moved into the positions of the discs 13 in Fig. 1, lubricant will be carried toward the midpoint of the shaft; and, unless suitable means is provided for preventing, when the discs 13 are subsequently moved away, lubricating material may be left upon the shaft adjacent the midpoint thereof, later to be thrown outwardly by centrifugal action. Lubricating material so thrown outwardly will either strike the inner surface of the belt and ultimately work laterally onto the active edge surfaces thereof, or will actually fall upon the coned surfaces of the discs. Obviously, a lubricant coming between the active edges of the belt and coned disc surfaces will seriously affect the efficiency of a transmission of the character illustrated.

Attempts have been made to overcome this difficulty, one proposed solution being illustrated in Patent 761,910 issued to M. O. Reeves on June 7, 1904; but it has been found that the expedient illustrated in that patent, while beneficial, is not sufficiently fool proof to constitute a thoroughly satisfactory solution to the problem. In Patent 2,155,005 to Brooks, issued April 18, 1939, there is illustrated a structure somewhat similar to the structure which partakes of the ideas of Patent 761,910 and which, structurally, is somewhat similar to the device of the present application; but which makes no provision for discharge of lubricant from the system. That is, in the device of the Brooks patent, the lubricant which has once been used and which works its way back into the reservoir, is subsequently reintroduced into the region between the disc and the shaft; and no provision is made for discharging excess lubricant from the organization.

According to the present invention, a light grease is preferably used in place of the oil of the Brooks patent. Each of the shafts 11 and 12 is hollow, being formed with an axial passage 18 into which grease may be injected under pressure through the fitting 19. Some of that grease will work its way through radial ports such as the port 20 into the region between the outer surface of the shaft 12 and the bore 23 of the disc 14, including the grooves fitting the splines 21 and 22 on the shaft 12.

The disc 14 is formed with a rearwardly projecting axial hub 24 having an enlarged portion 25, said enlarged portion being rabbeted as at 26 for a reason later to become apparent. A thrust bearing 27 is mounted upon the smaller portion of the hub 24, bearing against the rear surface of the enlarged portion 25, and is housed in a stationary element comprising a shell or sleeve 28 having an annular flange 29 which closely surrounds the periphery of the enlarged portion 25. Said flange is preferably formed with a pair of grease retaining grooves 30.

An equalizer ring 31 of standard construction is associated with the shell 28, and the rollers 32 carried by the levers 16 bear against said equalizer ring to shift the disc 14 in a standard manner.

The hub 24 is formed, within the enlarged portion 25, with a plurality of passages, two of which, 33 and 34, are shown in Fig. 2, which lead radially outwardly and rearwardly from an annular groove 35 formed in the interior surface of the hub to the rabbetted portion 26 of the hub enlargement. It will be seen that the shell 28 is so formed as to provide, in cooperation with said rabbetted portion 26, an annular chamber with which communicates one end of a stationary conduit 36 which is so constructed as to discharge over a dam or barrier 37 upstanding from the floor of the casing 41, into a pan 38 which, in turn, discharges through a port 39 into a sump space 40.

Centrifugal action of the rotating parts is depended upon entirely to carry excess grease away from the coned face of the disc 14. The groove 35 will prevent grease from working its way beyond said groove toward the left as illustrated in Fig. 2. That is, any grease which is carried toward the midpoint of the shaft 12 by movement of the disc in that direction, will tend, upon return movement of the disc, to be thrown into the groove 35, whence it will be led through passages 33 and 34 and any other such passages which may be formed in the disc hub, into the chamber formed by the rabbetted portion 26. Centrifugal force will tend to throw grease collecting in said chamber onto the inner wall of the flange 29; and grease collecting on that wall will tend to flow downwardly to the lowermost point of said flange where the conduit 36 is connected, so that the grease will flow downwardly through said conduit and be discharged into the region 38.

I claim as my invention:

1. The combination with a shaft of a coned disc splined thereon and axially slidable with respect thereto, means for introducing a lubricant between said shaft and said disc, said disc being provided with a hub projecting rearwardly from the face of said disc opposite its coned face, a stationary element sleeved on said hub, conduit means leading from the interior of said element to the outside thereof, and at least one passage formed in said hub and leading radially outwardly from the region between said disc and said shaft to the interior of said element.

2. The combination with a shaft of a coned disc splined thereon and axially slidable with respect thereto, means for introducing a lubricant between said shaft and said disc, said disc being provided with a hub projecting rearwardly from the face of said disc opposite its coned face, a stationary element sleeved on said hub, conduit means leading from the interior of said element and discharging to the exterior thereof at a point remote from the coned face of said disc, and at least one passage formed in said hub and leading radially outwardly from the region between said disc and said shaft to the interior of said element.

3. The combination with a shaft of a coned disc splined thereon and axially slidable with respect thereto, means for introducing a lubricant between said shaft and said disc, said disc being provided with a hub projecting rearwardly from the face of said disc opposite its coned face, a stationary element sleeved on said hub, conduit means leading from the interior of said element to the outside thereof, and at least one passage formed in said hub and leading radially outwardly and rearwardly from the region between said disc and said shaft to the interior of said element.

4. The combination with a shaft of a coned disc splined thereon and axially slidable with respect thereto, means for introducing a lubricant between said shaft and said disc, said disc being provided with a hub projecting rearwardly from the face of said disc opposite its coned face, a stationary element sleeved on said hub, conduit means leading from the interior of said element and discharging to the exterior thereof at a point remote from the coned face of said disc, and at least one passage formed in said hub and leading radially outwardly and rearwardly from the region between said disc and said shaft to the interior of said element.

5. The combination with a shaft of a coned disc splined thereon and axially slidable with respect thereto, means for introducing grease through said shaft to the region between said shaft and said disc, said disc being provided with a hub projecting rearwardly from the face of said disc opposite its coned face, a stationary element sleeved on said hub, conduit means leading from the interior of said element to the outside thereof, and at least one passage formed in said hub and leading radially outwardly from the region between said disc and said shaft to the interior of said element.

6. The combination with a shaft of a coned disc splined thereon and axially slidable with respect thereto, means for introducing a lubricant between said shaft and said disc, said disc being provided with a hub projecting rearwardly from the face of said disc opposite its coned face, a stationary element sleeved on said hub, conduit means leading from the interior of said element and discharging to the exterior thereof at a point remote from the coned face of said disc and separated therefrom by a dam, and at least one passage formed in said hub and leading radially outwardly from the region between said disc and said shaft to the interior of said element.

7. The combination with a shaft of a coned disc splined thereon and axially slidable with respect thereto, means for introducing a lubricant between said shaft and said disc, said disc being provided with a hub projecting rearwardly from the face of said disc opposite its coned face, a stationary element sleeved on said hub, conduit means communicating with the interior of said element and extending rearwardly therefrom, and at least one passage formed in said hub and leading radially outwardly and rearwardly from the region between said disc and said shaft to the interior of said element.

8. The combination with a shaft of a coned disc splined thereon and axially slidable with respect thereto, means for introducing a lubricant between said shaft and said disc, said disc being provided with a hub projecting rearwardly from the face of said disc opposite its coned face, a stationary element sleeved on said hub and providing an annular chamber, a pipe conduit communicating with the interior of said element and leading rearwardly therefrom to a point remote from the coned face of said disc, and at least one passage formed in said hub and leading radially outwardly and rearwardly from the region between said disc and said shaft to the interior of said element.

PAUL B. REEVES.